Nov. 27, 1951 — A. T. FLETCHER — 2,576,291
MACHINE FOR CUTTING GLASS DISKS
Filed Dec. 26, 1947 — 3 Sheets-Sheet 1

INVENTOR.
ARTHUR T. FLETCHER.
BY
Louis V. Lucia
ATTORNEY.

Nov. 27, 1951     A. T. FLETCHER     2,576,291
MACHINE FOR CUTTING GLASS DISKS
Filed Dec. 26, 1947     3 Sheets-Sheet 2
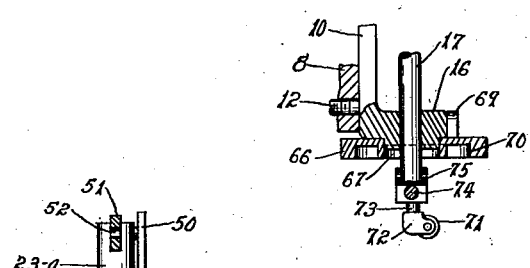
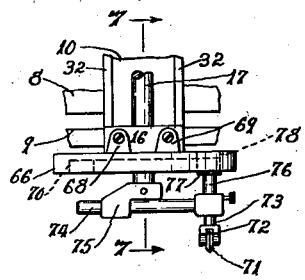
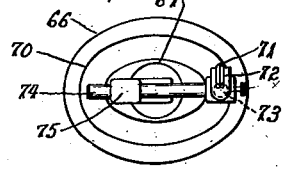
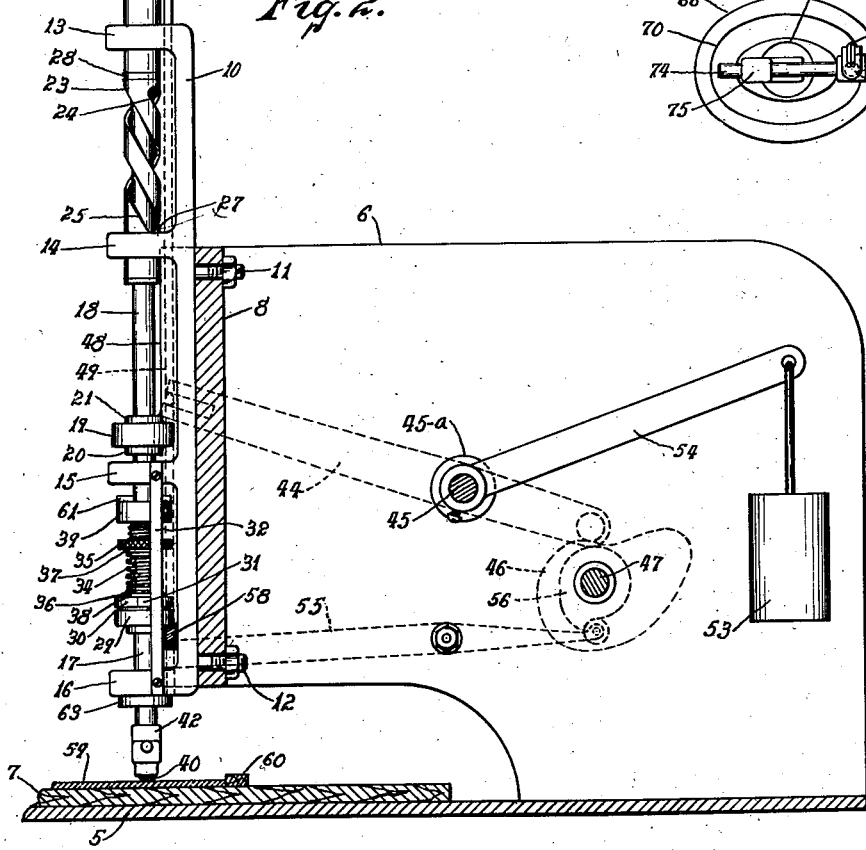
INVENTOR.
ARTHUR T. FLETCHER
BY
ATTORNEY Nov. 27, 1951     A. T. FLETCHER     2,576,291
MACHINE FOR CUTTING GLASS DISKS
Filed Dec. 26, 1947     3 Sheets-Sheet 3
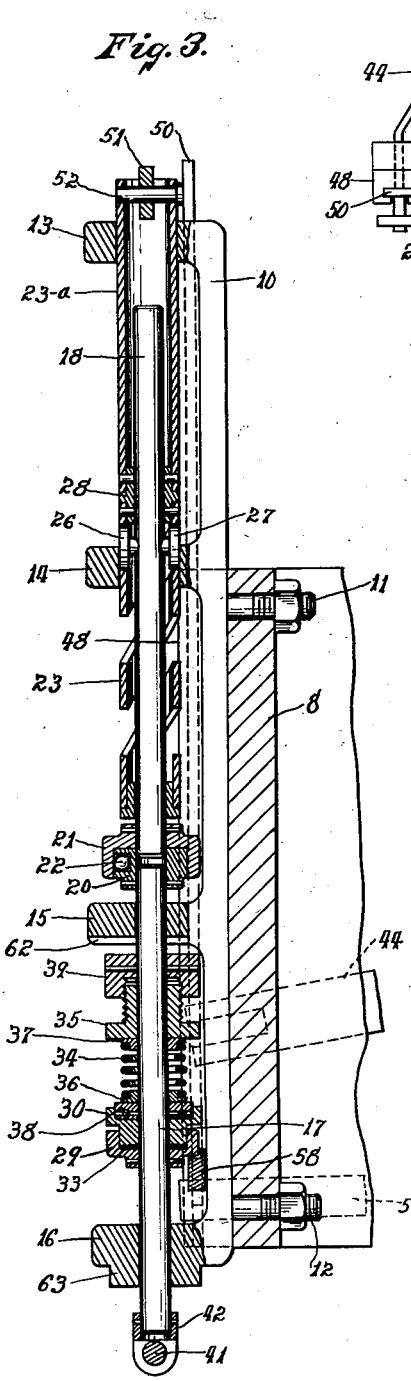
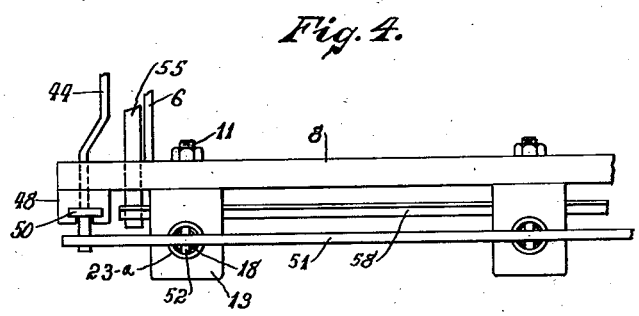
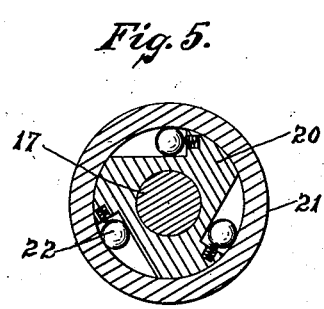
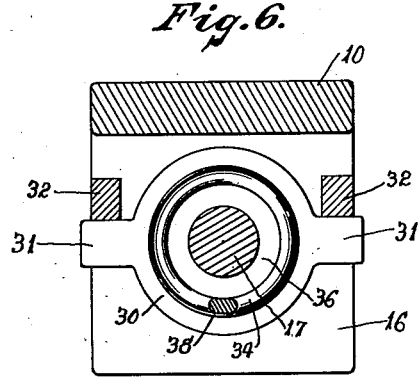
INVENTOR.
ARTHUR T. FLETCHER
BY
ATTORNEY.

Patented Nov. 27, 1951

2,576,291

UNITED STATES PATENT OFFICE 2,576,291

MACHINE FOR CUTTING GLASS DISKS

Arthur T. Fletcher, Bristol, Conn.

Application December 26, 1947, Serial No. 793,938

10 Claims. (Cl. 33—27)

This invention relates to machine for cutting glass disks and more particularly to a machine that is adapted to cut glass disks from sheets of glass on a quantity basis.

An object of the invention is to provide a machine which will cut a plurality of glass disks simultaneously and which is adjustable so that each individual cutter may be operated upon the work, or sheet of glass, with the proper amount of pressure to correspond with the condition of the cutter.

A further object of the invention is to provide a machine having a plurality of cutting units in which each of said units may be separately adjusted to vary the pressure with which the cutter thereof is applied to the work in accordance with the particular condition of the said cutter.

A still further object of the invention is to provide a machine for cutting glass disks which is highly efficient and which will produce a plurality of disks uniformly cut at each operation thereof.

Further objects and advantages of this invention will be more clearly understood from the following description and from the accompanying drawings, in which—

Fig. 2 is a sectional side view thereof on line 2—2 of Fig. 1.

Fig. 3 is an enlarged sectional side view on line 3—3 of Fig. 1.

Fig. 4 is a plan view showing the construction of a corner portion of my improved machine.

Fig. 5 is an enlarged plan view on line 5—5 of Fig. 1 showing the construction of the one-way clutch used in my machine.

Fig. 6 is a enlarged plan view, on line 6—6 of Fig. 1, showing the brake mechanism used in my machine.

Fig. 7 is a sectional side view, on line 7—7 of Fig. 8, of the lower portion of my improved machine and illustrating the mechanism employed for cutting non-circular pieces from a plate of glass.

Fig. 8 is an elevational front view thereof.

Fig. 9 is a bottom view of said mechanism when employed to cut an oval shaped piece from a sheet of glass.

Figure 1:
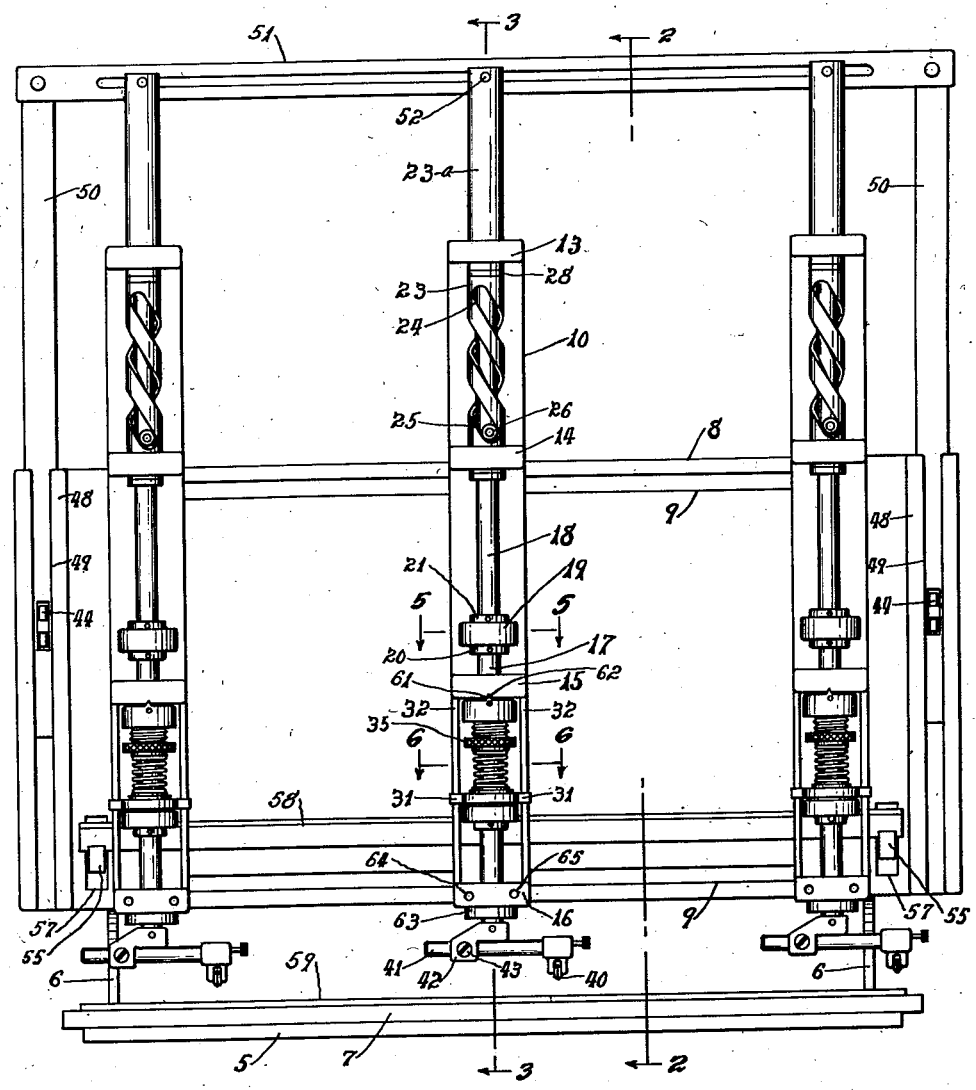
Fig. 1 is an elevational front view of a machine embodying my invention.

As shown in the drawings, a machine embodying my invention may comprise a frame having a base 5 with side members 6—6 to provide a work table 7 on which a sheet of glass may be placed for cutting disks therefrom. In the embodiment illustrated, there are provided a plurality of cutting units which are adjustably mounted on a vertical supporting plate 8 which is secured to the side plates 6—6 and is provided with slots 9—9.

Each of the cutting units preferably consists of a frame 10 that may be secured to the supporting plate 8 by means of studs 11—12 which project rearwardly from said frame through the slots 9—9 in said plate, as clearly illustrated in Fig. 2.

The said frame 10 has a plurality of spaced projections or brackets 13—14—15—16 which extend forwardly from the frame and provide bearings for movable parts of the mechanism of said units.

The said mechanism preferably includes a vertical shaft 17 which is rotatably and slidably carried between the bearing brackets 15—16 and is aligned with an operating shaft 18 that is connected to the said shaft 17 by means of a one-way clutch 19 of suitable construction.

The said clutch may include a cam member 20 that is fixed to the upper end of the shaft 17, a drum member 21 that is fixed to the bottom or lower end of the shaft 18 and suitable engaging means, such as balls 22, which cause said clutch to operate, as will be understood by those skilled in the art, for rotating the shaft 17 to permit uni-directional rotation thereof by the duo-directional rotation of the shaft 18; the said shaft 18 being driven in opposite directions of rotation by means of a sleeve 23 that is vertically slidable in the brackets 13—14 and has opposed spiral slots 24—25 therein which extend for slightly more than a complete turn around said sleeve and receive driving rollers 26—27 that are carried by the shaft 18 and rotate said shaft in opposite directions, as will be hereinafter described.

In the construction shown, the sleeve 23 is divided from the upper portion 23-a and has an interconnecting bushing 28 which provides a bearing for the shaft 18 within said sleeve.

The shaft 17 carries a braking device preferably comprising a cup shaped member 29, which is fixed to said shaft, and a braking member 30 which projects into said member 29 and is retained against rotation by means of lugs 31—31 projecting therefrom and slidably engaging the front edges of bars 32—32, which are attached to the brackets 15—16, and thereby prevent rotation of the member 30 with the shaft 17 while permitting vertical movement of said member with the shaft.

The said braking mechanism is provided with a friction disk 33 positioned between the inside surface of the brake member 29 and the bottom surface of the member 30. A spring 34 is mounted on said shaft between the member 30 and an adjusting sleeve 35 and centered on the shaft by washers 36—37. The washer 36 abuts the hub of a bearing 38 which is contained within a recess in the member 30 and the washer 37 is urged against the bottom of the adjusting sleeve 35 which is threaded to a collar 39 that is fixed to the shaft 17. The said sleeve 35 is adjustable in the collar 39 to vary the amount of pressure on the spring 34 for adjusting the pressure applied upon the friction disk 33 by the member 30 to thereby vary the braking action on the shaft 17.

Any suitable glass cutting tool may be mounted in the lower end of the shaft 17 and such cutting tool may be of conventional form such as comprises a glass cutting wheel 40 which is mounted on a horizontal bar 41 that is adjustable in a bracket 42, by means of an adjusting screw 43, to vary the distance between the said cutting wheel and the axis of the shaft 17 for cutting disks of different sizes from a sheet of glass.

Various forms of driving means may be employed for operating the cutter units on the machine. In the embodiment illustrated there is preferably employed a pair of rocker arms 44 which are securely fastened to the ends of a rocker shaft 45 projecting through bushings 45-a in the side plates 6—6 and actuated by a pair of suitable cams 46 which are located adjacent to said plates and mounted on a driving shaft 47 that is connected to a source of power not shown.

The said arms 44 project through slots in the vertical plate 8 and in the vertical ways 48—48 which are mounted in front of and near the opposite sides of the machine on the plate 8. Each of said ways 48—48 has a T-slot 49 in which is mounted a vertically slidable bar 50 that is operated by its respective rocker arm 44. The bars 50 carry between them a horizontal operating bar 51 having an elongated slot therein by means of which the sleeve 23 of each cutting unit is adjustably connected to said operating bar with a connecting pin 52.

In order to retain the sleeves 23 in their normally raised positions, a counterbalance is provided in the form of a counterweight 53 attached to a lever 54 that is securely fastened to the rocker shaft 45; the said counterweight thus applying to the said shaft a turning movement in a direction opposite to that applied to the shaft through the levers 44—44 by the weight of the sleeves 23 and the various parts connected therewith. The counterweight also serves to maintain the cam follower on the lever 44 in contact with the surface of the cam 46 throughout the cutting cycle.

In order to return the cutters to their normally raised positions, there are provided a pair of rocker levers 55—55 which are pivotally mounted on studs extending outwardly from the side plates 6—6. The said rocker levers are actuated by suitable cams 56 mounted on the drive shaft 47. The ends of the rocker levers project through vertical slots 57—57 in the plate 8 and carry a horizontal lifting bar 58 which extends across the machine and preferably under the cup 29 of the brake mechanism projecting from each of the cutting units, as illustrated in Fig. 2. The said lifting bar is operated in a definite phased relation to the arms 44—44 to lift the cutter from the glass sheet 59 upon the completion of a cutting cycle.

It will be understood from the above description that the desired number of cutting units may be incorporated in said machine and spaced thereon in accordance with the particular size of the disks which are to be cut. In the machine illustrated three disks are cut simultaneously from spaced portions of a piece of glass, and the units are so spaced that the in-between portions of the glass may also be utilized for cutting disks therefrom and close to the adjoining disks so as to avoid unnecessary waste of material.

Assuming that the machine has been adjusted for cutting certain sizes of disks, the operation thereof is as follows:

A sheet of glass, indicated at 59, is placed upon the table 7 and preferably against a guide stop 60. The machine is then set in operation by such action as closing an electric switch to energize the power source and thereby cause clockwise rotation of the drive shaft 47 which carries the cams 46 and 56.

As illustrated in Fig. 2, it will be noted that, at the instant the cam 56 begins to rotate, the follower on the lever 55, which in its lower position rests on the high point of the said cam, will rise up into the depression occurring thereafter and allow the lifting bar 58 to drop downwardly. The cams 36 will then actuate the rocker arms 44 to move the slide bars 50 downwardly and cause the cross bar 51 to move each of the sleeves 23 in a downward direction from the position illustrated in Figs. 1 and 2 to the position illustrated in Fig. 3.

The downward movement of said sleeves will cause the shafts 17 and 18 to be lowered therewith until the cutter wheels 40 engage the surface of the glass sheet from which the circles are to be cut and present a resistance to further movement of the sleeves 23. Continued downward movement of the sleeves will then cause the shafts 18 to be rotated by the spiral slots 24—25 and, through the one-way clutch 19, rotate the shafts 17 against the braking action of the friction disks 33 in the braking mechanisms. This braking action may be regulated for each individual cutter unit, by varying the pressure of the spring 34 to provide the proper amount of resistance to the rotation of the shaft 17 and thereby selectively regulate the amount of pressure with which the cutter wheel is applied against the surface of the glass sheet for a cutting operation.

Each cycle of operation of the cam 46 will cause the sleeves 23 to move the cutters 40 downwardly into contact with the glass 59, as illustrated in Fig. 2, rotate the shafts 17 and 18 slightly more than one full revolution for a cutting operation, and then raise the sleeves to their normal positions, as illustrated in Fig. 1. As the said sleeves are being raised, the shafts 18 will be rotated in a contra-clockwise direction and, due to the action of the one way clutches which will permit the said shafts to rotate free, no lifting action will be applied thereto, nor to the shafts 17, for lifting the cutters from the glass sheet 59, but the cam follower on the levers 55 will ride up the surfaces of the cams 56 and cause the said levers to raise the lifting bar 58 against each of the brake cups on the shafts 17 and raise the said cutters to their normal positions, as illustrated in Fig. 1, wherein they are spaced above the surface of the glass 59 to permit its removal and insertion of the next piece of glass to be cut.

The shafts 17 and 18 are rotated for slightly more than one full revolution in order that the cutters may be carried around, while in contact with the glass sheet, to complete a circle with a slight over-ride to assure a full cut for each operation. This will cause the wedge shaped projections 61 on the collars 39 to move with their central axis slightly past the central axis of the notches 62 in the brackets 15.

As the cutter units are returned to their normal raised positions, after each cutting operation of the machine, the said projections 61 will enter into the wedge shaped notches 62 and thereby rotate the shaft 17 in a reverse direction for a slight distance, so as to permit the cutters to start their subsequent cutting operation from a slightly rearward position as they contact the glass, and thereby provide the above described over-ride and still permit the cutters to start and finish each cutting operation from the same predetermined positions.

It will, therefore, be understood that, for each operation of the machine, the cutters will move downwardly from a predetermined starting position until they come into contact with the surface of the glass sheet, then swing around on said glass for slightly over a full turn to perform the cutting operation with a slight over-ride, then rise from the glass, and then swing back for the distance of the over-ride and come to rest in starting position.

From the above description, it will be further understood that the pressure with which the cutter 40 is applied against the surface of the glass sheet 59 may be regulated by simply turning the adjustment sleeve 35 to vary the pressure exerted by the spring 34 against the brake member 30 since the downward pressure required to rotate the shafts 18 and 17 varies directly with the resistance to the rotation of said shafts. Therefore, an increase in the tension of the said spring will increase the braking action and thereby increase the resistance to the rotation of the shafts 17 and 18, by the action of the spirals 24 against the rollers 26 and 27, and cause an increase in the pressure with which the cutters 40 are applied to the glass. Any decrease in the pressure of the spring 34 will decrease the resistance to the rotation of the said shafts by the spirals 24 and thereby decrease the pressure with which the cutters 40 are applied against the glass.

It will also be understood that my invention provides novel and highly efficient means for selectively varying the pressure with which a cutter is applied to a piece of material to be cut by simply changing the resistance to the rotation of the drive shaft for said cutter. In other words, my invention provides a means for variably converting torque into pressure or, stated in another way, a means for selectively varying the end thrust of a drive shaft by applying a variable resistance to its rotation.

My novel means for providing selectivity of pressure between the cutter and the glass is highly desirable in glass cutting machines since it permits the adjustment of the pressure with which a particular cutter is applied to the glass in accordance with its condition so that, when the cutter is dull, the pressure can be increased and, when the cutter is sharp, the pressure may be decreased. Therefore, in multiple unit machines such as above described, my invention will permit the adjustment of the individual cutters so that each of them will cut the same sheet of glass uniformly with the rest of the cutters and so that, after the lines of the cut for the different circles have been scribed upon the surface of the glass, the circles may be readily separated from the sheet of glass.

In the use of the machine illustrated in Fig. 1, the first cycle of operation will cut three circles in the glass 59. The said glass is then moved endwise along the stop 60 and the machine is again operated. The second cycle of operation will cut three more circles in the same piece of glass and between those previously cut. In this manner, a plurality of circles may be cut close to each other to thereby eliminate waste of material.

I have further provided in my machine novel and efficient means for cutting any variety of irregular shapes from a sheet of glass, as in the embodiment illustrated in Figs. 7 to 9, wherein the numeral 63 denotes a depending boss which is provided on the bracket 16 of the frame 10, the front of said bracket containing tapped holes 64—65. A template 66 having an opening 67 therein to receive the said boss is fastened to the bracket 16 by means of screws which extend through fastening ears 68—69 projecting from the top of the said template 66 into the holes 64—65. The under side of the template is provided with an endless groove 70 which forms a confined cam for a desired shape to be cut from the sheet of glass. A glass cutting tool used with said template preferably consists of a cutting wheel 71 rotatably mounted in a yoke 72 having a shaft 73 projecting therefrom which is swivelly mounted in an enlarged portion of a horizontal bar 74. The cutting wheel 71 is offset from the axis of the shaft 73 and functions as a caster during the cutting cycle. The bar 74 is free to slide longitudinally in the holding bracket 75 which is secured to the shaft 17 and has a roller shaft 76 projecting therefrom co-axially with the shaft 73 and containing at its upper end a roller 77 which travels in the groove 70 and guides the cutting wheel over the surface of the glass.

The said template is provided with an elongated opening 78 over the groove through which the roller 77 may project when the cutter is in the raised position. At the start of the cutting cycle the roller will descend through said opening a distance equal to the drop of the cutting wheel 71 wherein it will register with the groove 70 and may travel therein during the cutting cycle above described.

I claim:

1. A machine for cutting forms from sheets of glass comprising a cutter, a member rotatable for moving said cutter along the surface of a sheet to cut a form therefrom, brake means for applying resistance against the rotation of said member, and means responsive to the said resistance for controlling the pressure with which said cutter is applied against the sheet.

2. A machine for cutting forms from a sheet of material which comprises a frame, a shaft rotatably and slidably mounted in said frame, a cutting tool carried by said shaft, means for causing endwise movement of said shaft and rotation thereof to carry the tool into engagement with the sheet of material and to rotate said tool thereon, and brake means for resisting the rotation of the shaft and thereby providing pressure between the tool and the sheet.

3. A machine as set forth in claim 2 wherein there is provided means for selectively varying the resistance to the rotation of the shaft and thereby causing variation of the pressure with which the tool is applied to the sheet.

4. A machine for cutting disks from a sheet of glass material which comprises a frame, a shaft rotatably and slidably mounted in said frame, a glass cutting tool carried by said shaft, means for moving said shaft endwise to carry the tool into contact with the sheet and rotating said shaft for performing a cutting operation with said tool, means for applying a braking action to the rotation of the shaft, and mechanism responsive to said braking action for applying pressure between the tool and said sheet during a cutting operation.

5. A machine for cutting disks from sheets of glass material comprising a glass cutting tool, a member for carrying said tool, means for operating said member to move said tool into contact with said sheet and around a circle while in contact with the sheet, adjustable brake means for applying different degrees of resistance to the rotation of said member, and mechanism responsive to said resistance for applying different degrees of pressure between said tool and sheet.

6. A machine for cutting disks from a sheet of glass material which comprises a cutting unit including a frame, a shaft rotatably and slidably mounted in said frame, a cutting tool carried at the end of said shaft, a sleeve co-axial with said shaft and movable relatively thereto, means including a spiral formation between said sleeve and shaft for causing rotation of the shaft by relative movement of the sleeve, and a braking mechanism for resisting the rotation of the shaft by said sleeve and thereby increasing the amount of endwise pressure required for the rotation of said shaft.

7. A machine for cutting glass disks from sheets of glass comprising a cutting unit including a frame, a shaft rotatably and slidably mounted in said frame, a cutting tool carried at the end of said shaft, a sleeve surrounding a portion of said shaft and movable lengthwise relatively to the shaft, the said sleeve having a spiral slot therein, a projection from said shaft extending into said slot, means for moving said sleeve lengthwise to cause rotation of said shaft by said spiral slot, a braking device for resisting rotation of the shaft to thereby increase the endwise thrust required thereon from said sleeve to cause rotation of the said shaft and thereby permit it to be first moved to bring the tool into contact with the sheet with a predetermined amount of pressure and then to rotate said tool upon the surface of the sheet for cutting a disk therefrom.

8. A machine of the character described for cutting glass disks from sheets of glass material which comprises a cutting unit including a frame, a plurality of bearing members in said frame, a first shaft rotatable and slidable in certain of said bearing members, a second shaft co-axial with said first shaft and continuing therefrom, means between said first and second shafts for causing uni-directional rotation of the first shaft by rotation of the second shaft, a sleeve on and movable along the axis of the second shaft, the said sleeve having a spiral groove extending lengthwise through its wall, means on said shaft extending into said groove, means for actuating said sleeve to cause rotation of the second shaft for rotating the first shaft, and a braking device carried by the first shaft to resist rotation thereof and thereby cause to be required an increase in the endwise thrust applied to said shafts during the rotation of the second shaft by the sleeve and thereby provide a proportionate increase in the pressure with which the tool is applied upon the sheet being cut.

9. A machine for cutting glass disks of the character described comprising a cutting unit including a frame adjustably mounted in said machine, spaced bearings in said frame, a first shaft rotatably and slidably carried in certain of said bearings, a second shaft continuing from the first shaft, a uni-directional clutch between said first and second shafts for causing uni-directional rotation of the first shaft by the second shaft, a sleeve co-axial with said second shaft and slidable in certain others of said bearings, the said sleeve having a spiral slot running lengthwise through the walls thereof, projections on said shaft extending into said spiral slots, means for moving said sleeve lengthwise in one direction and then returning it to normal position to thereby cause rotation of the second shaft in two directions and rotation of the first shaft thereby in one direction, a cutting tool carried upon the end of said first shaft, a brake mechanism for resisting rotation of said shafts to thereby cause the said sleeve to move said shafts lengthwise for bringing the tool into contact with the surface of the sheet whereupon lengthwise movement of said shafts is stopped and rotation of the shaft is permitted by continued movement of the sleeve, and adjustable means for selectively varying the resistance to the rotation of said shafts to thereby vary the amount of endwise pressure required for the rotation of the shafts and the amount of pressure with which the tool is applied against the surface of the sheet being cut.

10. In a machine for cutting glass circles from sheets of glass material; a cutting unit including a frame, a shaft rotatable in said frame, a cutter carried at the end of said shaft, means for supporting a sheet of glass below said cutter, mechanism operable for swinging said cutter around on the surface of said sheet and slightly over a complete rotation, a projection movable with said shaft, and stationary means on said frame engageable by said projection and operable for moving said cutter backwardly for the distance which it travels over the complete rotation and thereby returning the cutter to its predetermined starting position.

ARTHUR T. FLETCHER.

REFERENCES CITED

The following references are of record in the file of this patent:

UNITED STATES PATENTS

| Number | Name | Date |
|---|---|---|
| 528,731 | Morrison | Nov. 6, 1894 |
| 1,204,039 | Lindeburg | Nov. 7, 1916 |
| 1,256,156 | Orr | Feb. 12, 1918 |
| 1,296,886 | Waterloo | Mar. 11, 1919 |
| 2,044,577 | Klages | June 16, 1936 |
| 2,118,170 | Crowley et al. | May 24, 1938 |
| 2,214,666 | Elf et al. | Sept. 10, 1940 |
| 2,231,145 | Watanabe | Feb. 11, 1941 |
| 2,383,208 | Mustered | Aug. 21, 1945 |

FOREIGN PATENTS

| Number | Country | Date |
|---|---|---|
| 276,713 | Germany | July 17, 1914 |
| 549,953 | Germany | May 17, 1932 |